No. 784,483.

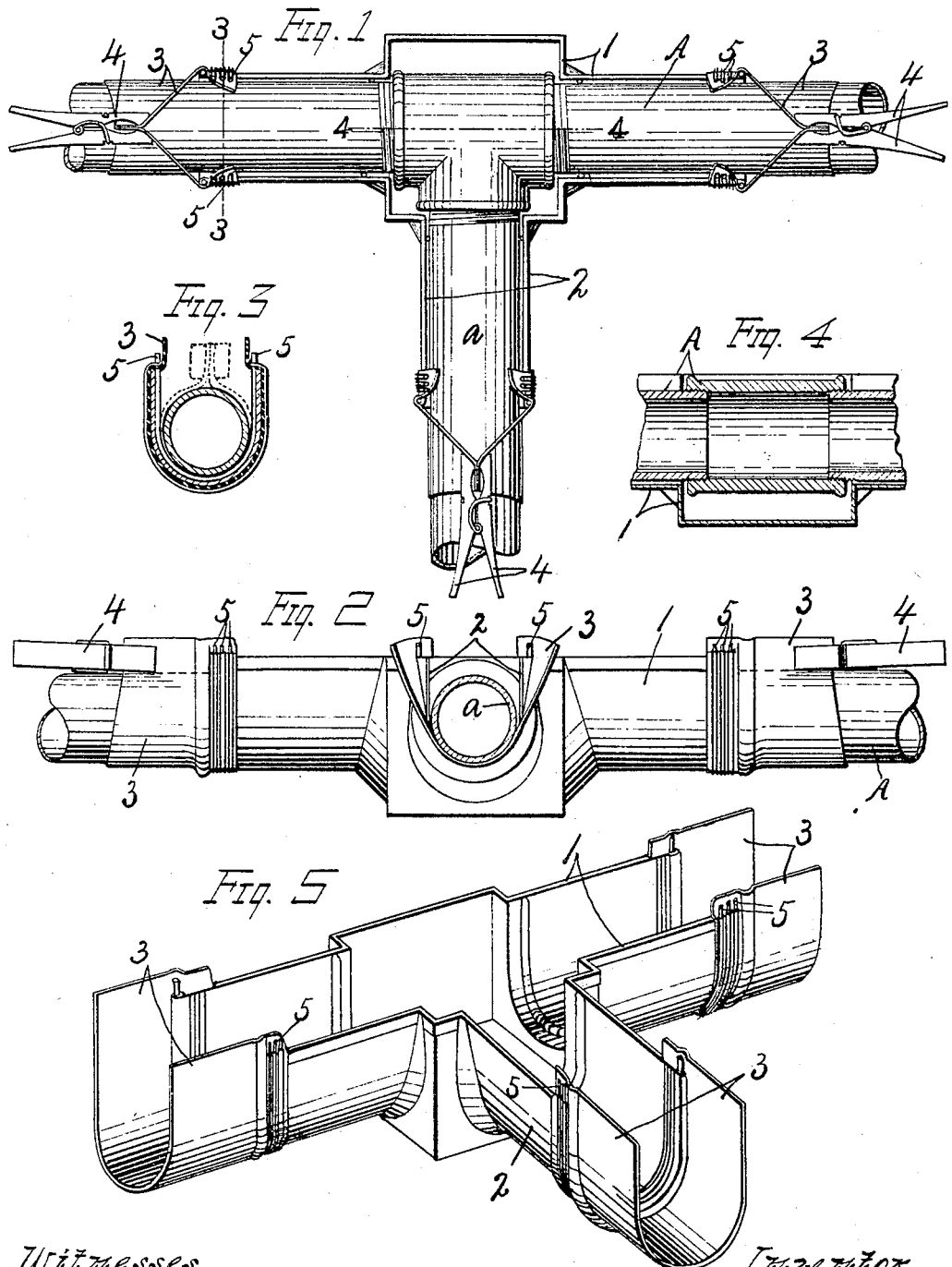

Patented March 7, 1905.

UNITED STATES PATENT OFFICE.

MARTIN J. ERK, OF BINGHAMTON, NEW YORK.

DEVICE FOR TESTING GAS-PIPES.

SPECIFICATION forming part of Letters Patent No. 784,483, dated March 7, 1905.

Application filed October 25, 1904. Serial No. 229,957.

*To all whom it may concern:*

Be it known that I, MARTIN J. ERK, of Binghamton, in the county of Broome, in the State of New York, have invented new and useful Improvements in Devices for Testing Gas-Pipes, of which the following, taken in connection with the accompanying drawings, is a full, clear, and exact description.

This invention relates to a device for testing gas-pipes, and is especially useful in locating even the slightest leaks in the pipe joints or fittings of acetylene or other gas plants or distributing systems. These leaks may be caused by the use of porous or crushed pipes or fittings which might be detected by proper tests before they are placed in the distributing system, but are more frequently the result of imperfect or loose joints which cannot be located until the system is completed and ready for use. Various means have been employed in making these tests, one of which consists in subjecting the system to internal gas or water pressure which, is indicated by a suitable pressure-gage, so that if a large leak exists the pressure in the system is reduced and is therefore indicated by the gage; but if the leak is extremely small considerable time must elapse before the pressure is reduced sufficient to be noticeable in the gage. This method of testing necessitates a careful scrutiny of all the parts and sides of the piping and fittings in the system before the leak can be located, and aside from being laborious it is found to be almost useless in locating very small leaks, such as in porous fittings, split seams, and comparatively tight joints.

My object is to subject the system to internal air or gas pressure and to provide an easily-portable open-sided receptacle which is adapted to be brought into position to partially envelop portions of the pipe or its fittings and to receive and retain a body of liquid, as water, which entirely envelops the part being tested, so that if any, even the slightest, leak exists it will be noticeable by the disturbance or accumulation of bubbles on the surface of the liquid.

Other objects and uses will be brought out in the following description.

Figure 1 is a top plan of a portion of a gas-distributing pipe system and my improved testing device applied thereto. Fig. 2 is a side view of the parts seen in Fig. 1. Figs. 3 and 4 are sectional views taken, respectively, on lines 3 3 and 4 4 of Fig. 1. Fig. 5 is a perspective view of the detached testing-trough.

In carrying out the objects stated I provide a main trough 1 with a branch trough 2, both of which are open at the top and are of sufficient size to receive and partially envelop a part of the gas-distributing system, as a main pipe A and its branch *a*. These troughs constitute an open-sided receptacle which is placed by hand under the pipe to be tested and is then elevated until the bottom of the receptacle engages or lies in close proximity to the bottom of the pipes, thereby partially enveloping said pipes. This receptacle is of greater depth than the diameter of the pipe, and therefore its sides project some distance above the top of the pipe when the receptacle is placed in position for testing.

The outer ends of the main and branch troughs 1 and 2 are provided with flexible extensions or flaps 3, of soft rubber or equivalent material, which are wrapped by hand around the adjacent portions of the gas-pipes A and *a*, and the upper edges of their sides are clamped together above said pipes by suitable fastenings 4, so as to close the open ends of the troughs, and thereby retain a liquid, as water, which is poured into the receptacle until it completely envelops the inclosed part of the gas-pipe system. Having thus enveloped the part to be tested in the liquid, it is evident that any leaks, however slight, will be manifest by a visible or audible disturbance caused by the ebullition of the gas at the surface of the water. The rubber flaps or wraps 3 are secured at one end to the adjacent end of the receptacle by any suitable fastening means, as spurs 5, so that they may be readily removed when rendered unfit for further use and replaced by new ones.

I have shown a form of device used for testing T-joints, and therefore the central portion of the main trough and adjacent end of the branch is somewhat enlarged to conform to the shape of the T; but it is evident that this same device may be used for testing any part of a main or branch pipe and also for testing couplings and elbows and unions, and, in fact, any part of the piping system by simply wrapping the flap or flaps not used around a suitable plug, (not shown,) so as to hold the water in the receptacle.

It is obvious that various forms of these receptacles may be employed in testing different parts of the pipe system, each to conform to the shape or position of the part to be tested—as, for instance, in testing coupling or union joints or straight pipe the branch $a$ may be dispensed with, while in testing elbow-joints one end of the main trough may be cut away and closed at one side of the branch, or in testing inclined pipes the sides of the low end of the receptacle would naturally be of greater depth than the higher end. Therefore I do not wish to limit myself to the precise form of receptacle shown.

Having thus fully described my invention, what I claim, and desire to secure by Letters Patent, is—

1. A device for testing gas-pipes, joints and fittings, comprising a receptacle open at the top and receiving the part to be so tested, said receptacle containing a quantity of liquid, as water, sufficient to envelop the inclosed pipe or joint and having flexible open ends to wrap upon the pipe.

2. A device for testing gas-pipes, joints and fittings, said device consisting of a trough open at the top and having flexible flaps at its ends to wrap around the adjacent portions of the pipe, said trough partially enveloping the part to be tested and containing a liquid as water, which envelops the part of the pipe within the trough.

3. A device for testing portions of a gas-pipe system, said device comprising main and branch troughs united to form a receptacle which is open at the top to receive the portion of the pipe to be tested, the outer ends of said troughs having flexible flaps to wrap around the adjacent portions of the pipe to retain liquid in the receptacle; said receptacle containing a liquid, as water, which envelops the inclosed pipe.

In witness whereof I have hereunto set my hand on this 21st day of September, 1904.

MARTIN J. ERK.

Witnesses:
 JAMES W. MANIER,
 F. HUGH FREEMAN.